United States Patent [19]
Graentzel

[11] 3,993,911
[45] Nov. 23, 1976

[54] PHOTOCHEMICAL REACTOR

[76] Inventor: Alfred Graentzel, Durmersheimerstrasse 98, 75 Karlsruhe 21, Germany

[22] Filed: Feb. 5, 1974

[21] Appl. No.: 439,933

[30] Foreign Application Priority Data
Feb. 7, 1973   Germany............................ 2305761

[52] U.S. Cl. ................................................. 250/527
[51] Int. Cl.² ............................................. B01K 1/00
[58] Field of Search .......... 250/527; 204/193, 158 R

[56] References Cited
UNITED STATES PATENTS

| | | | |
|---|---|---|---|
| 1,969,655 | 8/1934 | Mailey ................................. | 204/193 |
| 3,458,418 | 7/1969 | Beckmann .......................... | 204/193 |
| 3,476,669 | 11/1969 | Beckmann et al. .................... | 204/193 |
| 3,628,010 | 12/1971 | Tarkoey et al. ....................... | 250/527 |

*Primary Examiner*—Howard S. Williams
*Attorney, Agent, or Firm*—Edwin E. Greigg

[57] ABSTRACT

What follows is a description of an improved photochemical reactor which includes a reaction vessel, a UV-radiation source, and a structure defining an intermediate space between the reaction vessel and the radiation source. The reaction vessel is transparent to radiation and receives the substances to be irradiated. Within the intermediate space a luminescent material is disposed which transforms the UV-light of the radiation souce into a specific wavelength characteristic of the luminescent material and which effects the photochemical reactions of the substances within the reaction vessel.

16 Claims, 4 Drawing Figures

PHOTOCHEMICAL REACTOR

BACKGROUND OF THE INVENTION

The present invention relates to a photochemical reactor for performing photochemical reactions, and, more particularly, to a photochemical reactor comprising a reaction vessel transparent to radiation for receiving the substances to be irradiated, a UV-radiation source, and luminescent materials which transform the UV-light of the radiation source into a specific wavelength, characteristic of the luminescent material which effects the photochemical reactions of the substances.

In known reactors of this construction, the radiation sources employed are low pressure mercury lamps whose envelopes are coated with luminescent material. Depending on the desired wavelength, lamps with different luminescent coatings are used. These lamps, however, have only a limited lifetime because the luminescent materials decrease in their radiative efficiency after a certain operation time as a consequence of electrode vaporization. In addition, high cooling power is required for these lamps because the luminescent materials operate optimally only at the relatively low temperature of approximately 20° C.

OBJECTS AND SUMMARY OF THE INVENTION

It is an object of the present invention to provide a photochemical reactor of the kind described above, whose components permit substantially longer operating times as well as an increased utilization of the radiation source.

This and other objects are accomplished according to the present invention in that the luminescent materials are spatially separated from the radiation source and disposed between it and the reaction vessel in an intermediate space which may be evacuated or may be filled with a protective gas. The intermediate space can be created in that the reaction vessel is enclosed, at a predetermined separation, by an envelope of pure quartz. It is suitable for the reaction vessel to consist of glass or of a filtering quartz, and for the luminescent materials to be applied to its outer surface which is facing the radiation source. If, however, the substances to be treated must be immersed in liquid nitrogen or liquid air, then, in that case, the inner wall of the quartz envelope is provided with the luminescent materials in order that these may be held at the optimum operating temperature.

The methods employed according to the present invention make it possible for the lifetime and the permissible intensity of the radiation source to be no longer limited by the luminescent materials or by their efficiency because these materials are now located outside of the gas discharge space of the lamp; and, moreover, it is considerably easier with this location to hold them at their optimum operating temperature (approximately 20° C). This fact, in turn, permits both an increase of the radiated power as well as a better and longer utilization of the luminescent materials. In the normal case, the reaction vessel and the quartz envelope are demountably connected with one another by means of matching flanges. In this way, a reaction vessel with a particular luminescent coating layer can easily be exchanged with a vessel having another luminescent coating layer so that the apparatus can be adapted to different wavelengths. The same is true for the quartz envelope, if it carries luminescent materials. If, on the other hand, the reaction vessel is brought to very low temperatures, for example, by filling it with liquid nitrogen, then in order to maintain a vacuum of approximately $10^{-6}$ Torr in the intermediate space, the vessel and the quartz envelope must be fixedly fused together for sealing reasons. In that case, the substance or the solutions of substances are filled into separate quartz containers which are immersed in the liquid nitrogen, whereas the luminescent layer is applied to the inside of the outer quartz envelope in order to maintain the luminescent materials in a state of functional capability.

In order to achieve the best possible utilization of the radiation delivered by the radiation source, the quartz envelope extends up to the radiation source except for a small cooling gap.

According to a further advantageous development of the present invention, cylindrical displacement bodies can be inserted into the reaction vessel which, together with the inner wall of the reaction vessel, permit the formation of annular spaces of differing volume so that even very small quantities of a substance can be treated in the same vessel optimally. In particular, it is possible to achieve the same short irradiation times independent of the quantity of the substance which is present, because the usable radiation angle of the source remains the same when the envelope or vessel diameter remains the same. The displacement body, furthermore, can also be used at the same time for cooling the substances, namely, by developing it, for example, as a cooler, through which a cooling medium is passed.

In order to achieve uniform and optimum reaction of the substances to be irradiated, it is a further advantage to provide a cylindrical displacement body with a return line parallel to the axis of the displacement body and preferably centrally located of the reactor, this line being in communication on both sides of the axis with an annular space defined by the displacement body and on whose lower side there is disposed an externally actuated magnetic stirrer for the circulation of the substances. In this way, very high circulation speeds are achieved for the substances or the solutions of substances which accelerate the desired photochemical reactions in particular when the penetration depth of the radiation is small. Instead of using a stirrer, it is possible to use one or several drive lines and pass through them a protective gas, for example, nitrogen, which emerges at the lower end of the displacement body through sintering material attached at its periphery which further passes through the substance solution upwardly and tends to drive the solution along upwardly to the top end of the return line so that, in this way, a circulation of the substances is also initiated.

DESCRIPTION OF THE PREFERRED EMBODIMENTS

Figure 1:
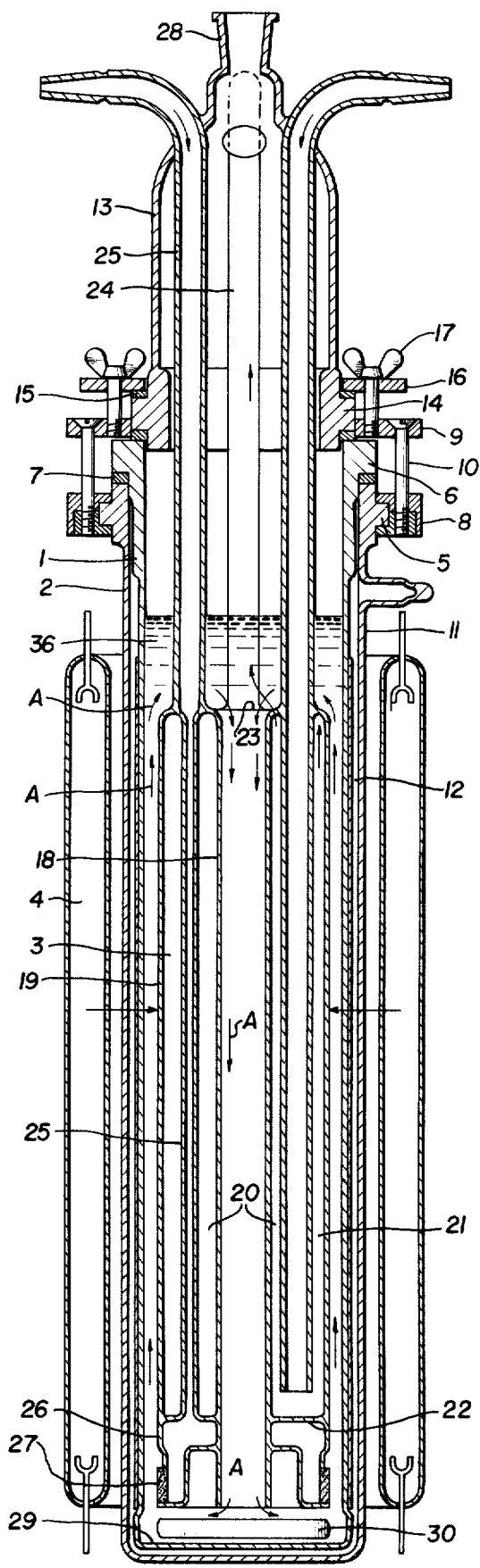
FIG. 1 is a schematic illustration of a longitudinal section through a photochemical reactor according to the present invention in which the outer quartz envelope and the reaction vessel are demountably connected.

The reactor according to the present invention substantially consists of a reaction vessel 1, a quartz envelope 2, a displacement body 3, and a radiation source 4 surrounding the quartz envelope 2. The reaction vessel 1 and the quartz envelope 2 are connected with one another at their top ends by means of flanges 5, 6, an intermediate seal 7, pressure rings 8, 9 and screws 10, so that they form an annular intermediate space 11 sealed toward the outside which may be evacuated or may be filled with a protective gas. The luminescent layer 12 is applied to the outside of the vessel 1. At the top and bottom, vessel 1 has a radial flare so that when the vessel is inserted into the envelope 2, the sensitive luminescent layer is not damaged. The displacement body 3 has a cap 13 on its upper portion which is connected with the vessel 1 by means of a flange 14, a seal 15, a pressure ring 16, screws 17 and the pressure ring 9.

The displacement body 3 consists substantially of two concentric tubes 18 and 19, which form a closed annular space 20. Into this space 20 is carried a coolant supply line 21 whose tip extends to the vicinity of the bottom 22 of the annular space 20. Connected to the upper end 23 of the annular space 20 is a return line 24 so that, after the coolant has left line 21, it streams through the annular space 20 from below to the top and is carried off by line 24.

A further tube 25 is also led through the cap 13 and through the annular space 20 and it terminates in a lower chamber 26 whose periphery is equipped with gas-permeable sintering material 27. All three tubes 21, 24 and 25 are soldered to the cap 13 so that a fixed connection exists between the cap 13 and the body 3.

If a driving or rinsing gas, for example, nitrogen, is carried through the tube 25, it exudes through the sintering material 27 and bubbles through the substance solution contained in the vessel 1 and flows out of the upper opening 28. During this process, the solution contained in the vessel 1 is driven upwardly (arrows A) along the wall of the vessel and flows backward through the central tube 18 of the displacement body 3 back to the bottom 29 of the vessel.

During the upward streaming of the substance solution, the secondary radiation of the luminescent substances 12, stimulated by the radiation source 4, impinges upon the substance and causes the desired photochemical reactions. The radiation source 4 is cooled in a per se known fashion. The radiated power, however, can be made considerably higher with the aid of the present invention than can be done in known reactors of this construction.

Instead of, or in addition to, the rinsing or driving gases, an externally driven stirrer 30 is provided at the bottom 29 of vessel 1 which aspirates the substance solution from tube 18 and pushes it upwardly along the wall of vessel 1.

In addition to the purpose already mentioned, the upper opening 28 serves the purpose of filling or emptying the vessel 1 with the substance solution; and possibly also for the introduction of measuring instruments, such as a thermometer.

Figure 2:
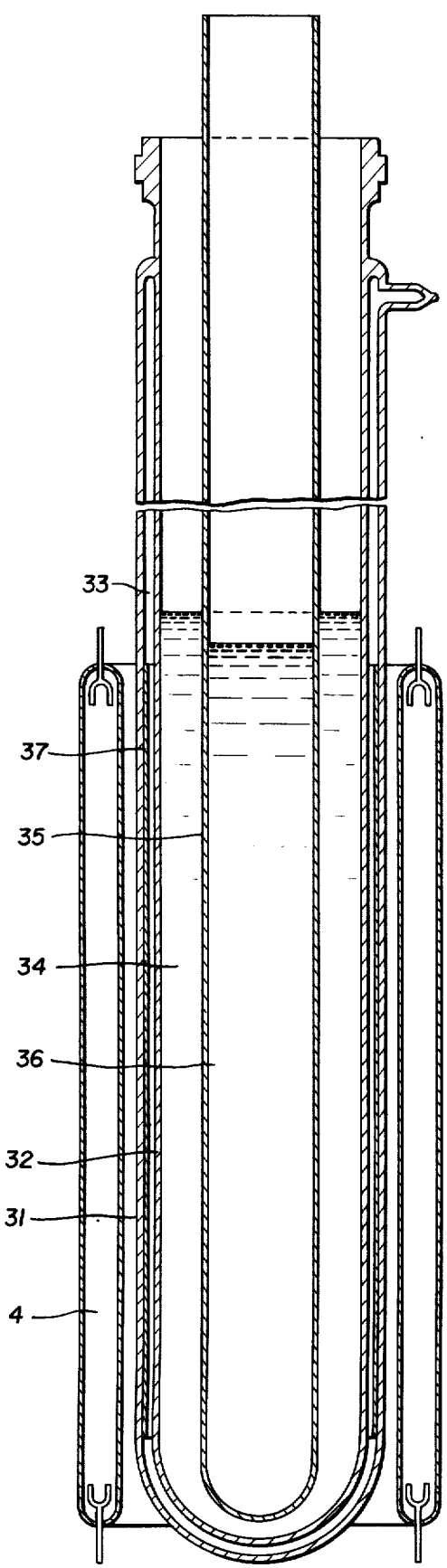
FIG. 2 illustrates the reactor according to another embodiment of the present invention in which the outer quartz envelope and the reaction vessel are fixedly fused together.

FIG. 2 illustrates another exemplary embodiment of the present invention which permits the treatment of the substances at very low temperatures. For this purpose, the quartz envelope 31 and the reaction vessel 32 are made of UV-opaque filtering quartz which are fused together at their upper ends while maintaining an intermediate space 33. The vessel 32 is filled with liquid nitrogen or liquid air 34 into which a further quartz vessel 35 is immersed which carries the substance solution 36. In this case, the luminescent layer 37 is applied to the inside of the quartz envelope 31.

Figure 3:
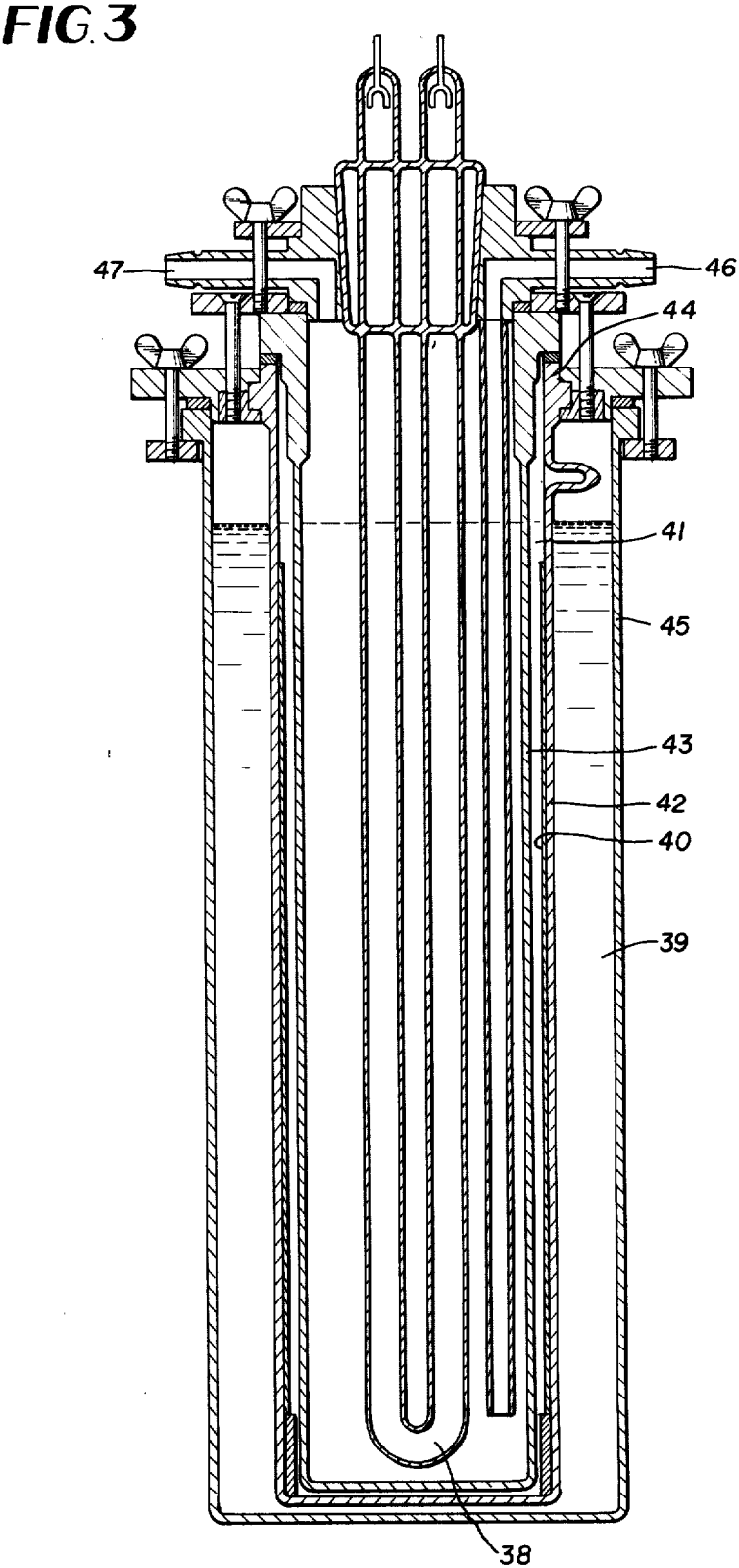
FIG. 3 schematically illustrates the reactor according to another embodiment of the present invention in which the reaction vessel annularly encloses the radiation source that is releasably connected with the quartz envelope coated with luminescent material.

FIG. 3 illustrates another exemplary embodiment of the present invention in which it is possible to dispose the UV-radiation source 38 (for example, a high pressure or low pressure mercury lamp) centrally instead of at the periphery and to provide an annular space 39 surrounding the source 38 for the substances to be illuminated, where the luminescent material layer 40 is placed also between source 38 and space 39 for the substance, in a separate intermediate space 41. For this purpose, the two quartz envelopes 42, 43 are sealed together at their upper end while maintaining an intermediate space 41. In this case, the luminescent material layer 40 is applied to the inside of the quartz envelope 42. The quartz envelope 42 is releasably connected with the irradiation vessel 45 by means of flanges 44.

In this way, exploitation of the radiation is increased even more. Cool air supply and effluent lines 46, 47 are provided for cooling the source.

Figure 4:
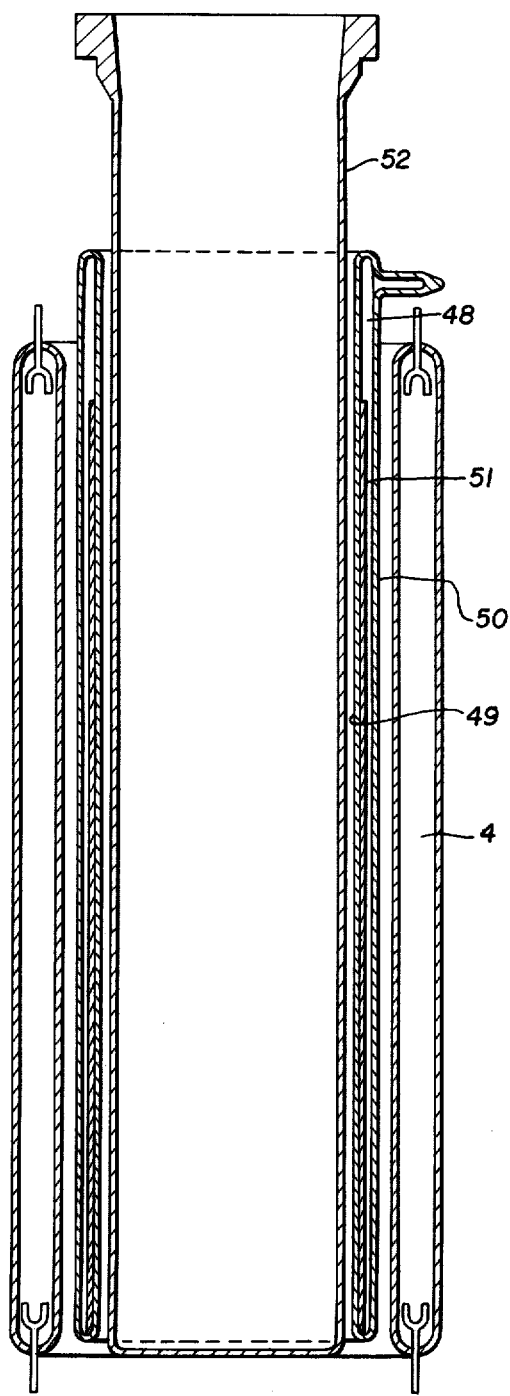
FIG. 4 illustrates the reactor according to yet another embodiment of the present invention in which the intermediate space is formed by two concentric tubes whose open ends are fused together to form a vacuum-tight seal.

In FIG. 4, the intermediate space 48 is formed by concentric quartz tubes 49 and 50 held at a distance from one another which are fused together at their face ends to form a vacuum seal. The luminescent material layer 41 is applied on the inner tube 49 within this intermediate space 48.

A vessel 52 consisting of quartz glass tubing for the substances to be irradiated is disposed centrally within the double tube 49, 50, whereas the radiation source 40 envelops the tubes 49, 50. This disposition can be used with advantage with relatively long irradiation vessels, and in this way, and above all, the danger of breakage is reduced.

The present invention is not limited only to the examples shown and explained. For example, it is also possible to dispose the UV-radiation source centrally instead of on the periphery and to provide an annular space surrounding the source for the substance where, in that case, the luminescent layer would also be disposed in a separate intermediate space lying between the source and the substance.

That which is claimed is:

1. In a photochemical reactor including a reaction vessel which is transparent to radiation and which receives the substances to be irradiated, a UV-radiation source, and luminescent material which transforms the UV-light of the radiation source into a specific wavelength characteristic of the luminescent material and which effects the photochemical reactions of the substances, the improvement comprising means defining an intermediate space between the reaction vessel and the radiation source, wherein the luminescent material is disposed within said intermediate space.

2. The photochemical reactor as defined in claim 1, wherein said intermediate space is evacuated.

3. The photochemical reactor as defined in claim 1, wherein said intermediate space is filled with a protective gas.

4. The photochemical reactor as defined in claim 1, wherein said luminescent material is applied to the outer surface of the reaction vessel.

5. The photochemical reactor as defined in claim 1, wherein the radiation source is disposed centrally within the reactor and is enclosed by an annular space defined by the reaction vessel and said intermediate space defining means and within which the substances to be irradiated are contained, and wherein the intermediate space is located between the radiation source and said annular space.

6. The photochemical reactor as defined in claim 1, wherein said means defining the intermediate space is formed by two concentric quartz tubes sealed together at their face ends and held at a distance from one another, said quartz tubes surrounding the reaction vessel.

7. The photochemical reactor as defined in claim 1, wherein said means comprises an envelope made of UV-light transparent material, said envelope enclosing the reaction vessel to define said intermediate space.

8. The photochemical reactor as defined in claim 7, wherein said reaction vessel is made of a filtered quartz opaque to UV-light and said envelope is made of pure quartz.

9. The photochemical reactor as defined in claim 4, wherein the reaction vessel is made of glass and said envelope is made of pure quartz.

10. The photochemical reactor as defined in claim 9, further comprising means for deep cooling of the substances, and wherein said luminescent material is applied to the inner wall of said quartz envelope.

11. The photochemical reactor as defined in claim 9, wherein the reaction vessel and said quartz envelope are demountably connected with one another.

12. The photochemical reactor as defined in claim 9, wherein said quartz envelope and the radiation source define a cooling gap between them.

13. The photochemical reactor as defined in claim 1, further comprising a plurality of displacement body means of differing sizes, said body means being insertable within the reaction vessel and defining therewith a plurality of annular spaces in the region of irradiation, said annular spaces having differing volumes through which the substances to be irradiated flow.

14. The photochemical reactor as defined in claim 13, wherein one of said displacement body means serves as a cooler means through which a coolant medium flows.

15. The photochemical reactor as defined in claim 13, further comprising a magnetic stirrer, wherein said displacement body means define an annular space about a central axis, at one end of which said magnetic stirrer is located to be externally driven, and a central return line which communicates with said annular space on both sides of said central axis.

16. The photochemical reactor as defined in claim 13, further comprising a gas permeable sintering material, wherein said displacement body means is fabricated as a thick-walled tube into which a driving or rinsing line is formed which is sealed at one end from the substances in the reaction vessel by said sintering material.

* * * * *